(12) United States Patent
Overson et al.

(10) Patent No.: US 9,582,666 B1
(45) Date of Patent: Feb. 28, 2017

(54) COMPUTER SYSTEM FOR IMPROVED SECURITY OF SERVER COMPUTERS INTERACTING WITH CLIENT COMPUTERS

(71) Applicant: SHAPE SECURITY, INC., Mountain View, CA (US)

(72) Inventors: Jarrod Overson, Santa Clara, CA (US); Siying Yang, Cupertino, CA (US)

(73) Assignee: Shape Security, Inc., Mountain View, CA (US)

( * ) Notice: Subject to any disclaimer, the term of this patent is extended or adjusted under 35 U.S.C. 154(b) by 36 days.

(21) Appl. No.: 14/706,346

(22) Filed: May 7, 2015

(51) Int. Cl.
*H04L 29/06* (2006.01)
*G06F 21/57* (2013.01)

(52) U.S. Cl.
CPC ........ *G06F 21/572* (2013.01); *H04L 63/1466* (2013.01); *G06F 2221/033* (2013.01)

(58) Field of Classification Search
CPC ............................ G06F 21/572; H04L 63/1466
USPC ........................................................... 726/22
See application file for complete search history.

(56) References Cited

U.S. PATENT DOCUMENTS

| | | | | |
|---|---|---|---|---|
| 7,415,618 B2 * | 8/2008 | de Jong | ................. | G06F 21/125 707/999.101 |
| 7,584,364 B2 * | 9/2009 | Jakubowski | ............ | G06F 21/14 713/189 |
| 8,176,473 B2 * | 5/2012 | Jacob | ...................... | G06F 21/14 713/187 |
| 2002/0099827 A1 | 7/2002 | Shah et al. | | |
| 2004/0162994 A1 | 8/2004 | Cohen et al. | | |
| 2005/0028002 A1* | 2/2005 | Christodorescu | ..... | G06F 21/562 726/3 |
| 2005/0071664 A1* | 3/2005 | de Jong | .................. | G06F 21/14 726/26 |
| 2008/0183902 A1 | 7/2008 | Cooper et al. | | |
| 2008/0288921 A1* | 11/2008 | Jacob | ...................... | G06F 21/14 717/120 |
| 2009/0007243 A1 | 1/2009 | Boodaei et al. | | |

(Continued)

FOREIGN PATENT DOCUMENTS

WO WO2013091709 6/2013

OTHER PUBLICATIONS

U.S. Appl. No. 14/290,805, filed Aug. 24, 2015, Notice of Allowance.

(Continued)

*Primary Examiner* — Michael S McNally
(74) *Attorney, Agent, or Firm* — Hickman Palermo Becker Bingham LLP

(57) ABSTRACT

A computer system is configured to improve security of server computers interacting with client computers, and comprises: a memory, a processor coupled to the memory, and source code obfuscation logic coupled to the memory and the processor. The source code obfuscation logic is configured to read, from the memory, one or more original source code instructions that are configured to achieve an expected result when executed by a web browser on a client computer; to apply one or more obfuscation transformations, to the one or more original source code instructions, to produce one or more obfuscated source code instructions that are configured to achieve the same expected result when executed by the web browser but is expressed in an obfuscated format; to write the one or more obfuscated source code instructions to the memory.

20 Claims, 4 Drawing Sheets

(56) References Cited

U.S. PATENT DOCUMENTS

| | | | |
|---|---|---|---|
| 2009/0144829 A1* | 6/2009 | Grigsby | G06F 21/6263 |
| | | | 726/26 |
| 2009/0193513 A1 | 7/2009 | Agarwal et al. | |
| 2009/0235089 A1* | 9/2009 | Ciet | G06F 21/577 |
| | | | 713/190 |
| 2010/0199354 A1* | 8/2010 | Eker | G06F 21/14 |
| | | | 726/26 |
| 2010/0257354 A1 | 10/2010 | Johnston et al. | |
| 2011/0107077 A1* | 5/2011 | Henderson | G06F 21/14 |
| | | | 713/150 |
| 2011/0131416 A1 | 6/2011 | Schneider | |
| 2011/0239113 A1 | 9/2011 | Hung et al. | |
| 2012/0124372 A1* | 5/2012 | Dilley | H04L 67/2819 |
| | | | 713/162 |
| 2013/0036473 A1* | 2/2013 | Myles | G06F 21/14 |
| | | | 726/26 |
| 2013/0232234 A1 | 9/2013 | Kapur et al. | |
| 2013/0232578 A1* | 9/2013 | Chevallier-Mames | G06F 21/10 |
| | | | 726/26 |
| 2014/0189499 A1 | 7/2014 | Gigliotti et al. | |
| 2016/0050231 A1 | 2/2016 | Varadarajan et al. | |

OTHER PUBLICATIONS

Currie et al., In-the-Wire Authentication: Protecting Client-Side Critical Data Fileds in Secure Network Transactions, dated 2009 2nd International Con. Adapt. Science & Tech. IEEE, pp. 232-237.

* cited by examiner

COMPUTER SYSTEM FOR IMPROVED SECURITY OF SERVER COMPUTERS INTERACTING WITH CLIENT COMPUTERS

FIELD OF THE DISCLOSURE

The present disclosure generally relates to security techniques applicable to client/server systems, and relates more specifically to techniques for improving resistance of server computers to attacks by client computers.

BACKGROUND

A scripting language is a programming language for writing computer programs in the form of scripts. Examples of scripting languages include JavaScript or ECMAScript, ActionScript, Dart, VBScript, Typescript, Ruby, and Python. A script is a program distributed as source code and executed by interpretation rather than compilation. Interpretation is advantageous because deployment and customization are simplified. These advantages make scripting well suited for adding custom behaviors to an already installed application, such as a web browser. Browser support has made JavaScript the most widely used programming language for the Internet.

Execution by interpretation may also present drawbacks for a scripting language. Since a script is distributed to a browser as source code, security and intellectual property are heightened concerns. Source code is vulnerable to reverse engineering, copying, spoofing, and cracking. For example, when script source code is delivered to a browser, malicious programs can alter the script source code for malicious purposes, such as capturing passwords, bank information, and other sensitive information, causing the browser to execute the maliciously altered script source code rather than the original script source code that the server computer generated. Algorithms and data are difficult to hide when source code is publicized.

Machine analysis is an important part of misuse of source code. For example, bots, compromised endpoints, or malicious software may attempt to read and analyze source code for malicious purposes. To achieve security by obscurity, techniques are needed to prevent or encumber machine analysis of scripts.

SUMMARY

The appended claims may serve as a summary of the invention.

Figure 1:
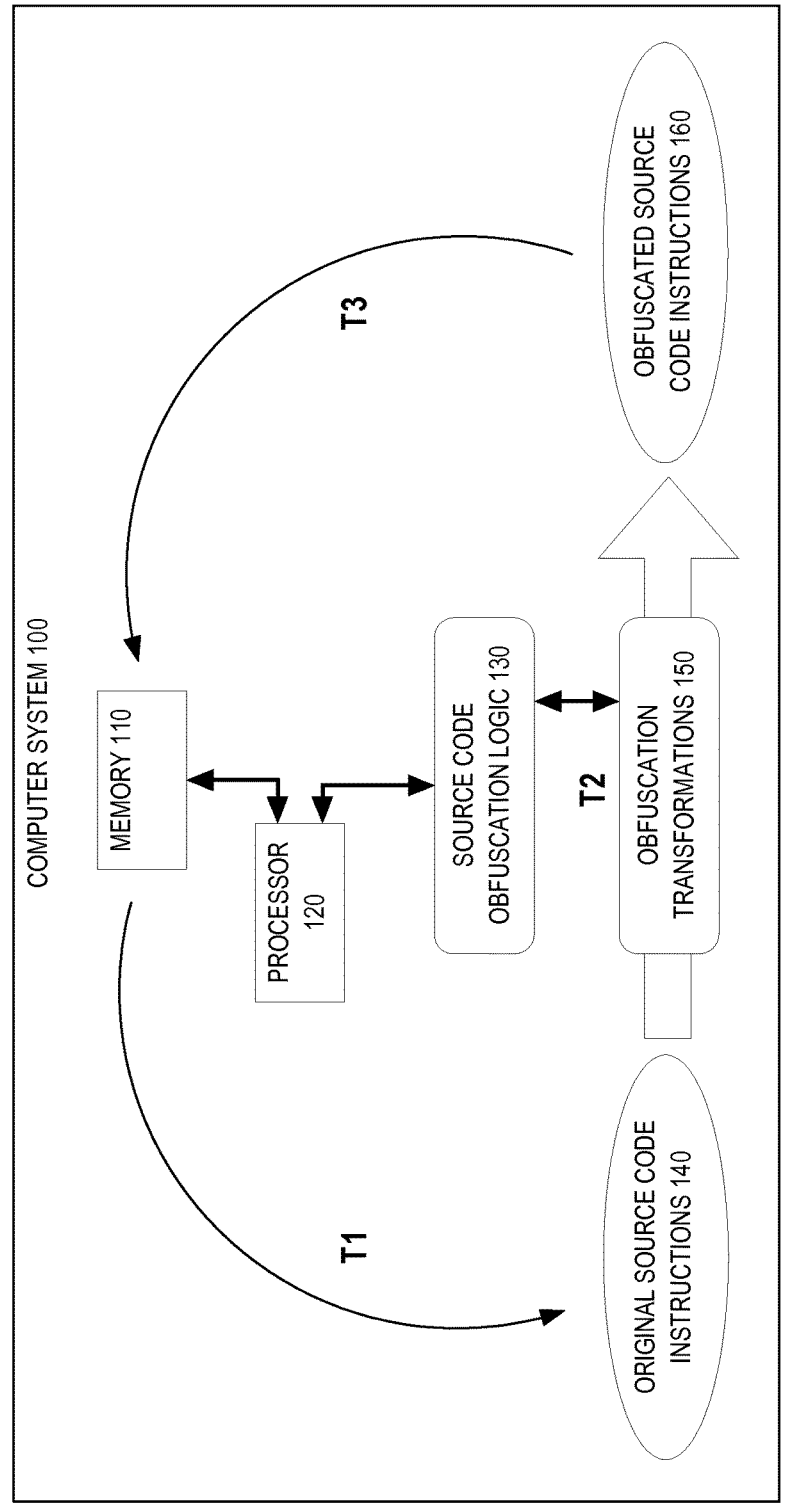
FIG. 1 illustrates functional units of a computer system that is configured to improve security of server computers interacting with client computers.

While each of the drawing figures illustrates a particular embodiment for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
   1.0 General Overview
   2.0 Computer Architecture for Script Obfuscation
   3.0 Script Obfuscation Process Details
   4.0 Example Network Topology
   5.0 Example Obfuscation Transformations
      5.1 Unobtrusive Obfuscations
         5.1.1 Numeric Expression Substitution
         5.1.2 Literal Deconstruction
         5.1.3 Visually Similar Identifiers
      5.2 Decoy Statements
         5.2.1 Duplicate Code Injection
         5.2.2 Distractor Functions
      5.3 Object Oriented Obfuscation Transformations
         5.3.1 Property Obfuscation
         5.3.2 Object Literal Obfuscation
      5.4 Obfuscation Transformations that Generate Functions
         5.4.1 Code Extraction
         5.4.2 Recursive Function Injection
         5.4.3 Immediately-Invoked Function Expression
      5.5 Document Object Model Awareness
         5.5.1 Predefined Object Aliasing
         5.5.2 Browser Object Model Enumeration
   6.0 Implementation Mechanisms—Hardware Overview
   7.0 Other Aspects of Disclosure

1.0 GENERAL OVERVIEW

In an embodiment, a computer system is configured to improve security of server computers interacting with client computers, and comprises: a memory, a processor coupled to the memory, and source code obfuscation logic coupled to the memory and the processor. The source code obfuscation logic is configured to read, from the memory, one or more original source code instructions that are configured to achieve an expected result when executed by a web browser on a client computer; to apply one or more obfuscation transformations, to the one or more original source code instructions, to produce one or more obfuscated source code instructions that are configured to achieve the same expected result when executed by the web browser but is expressed in an obfuscated format; and to write the one or more obfuscated source code instructions to the memory.

In an embodiment, a computer-implemented method for improving security of a server computer is configured to deliver computer program source code to a client computer, and comprises, using a security control computer that is topologically interposed between the server computer and the client computer: obtaining, from the server computer, one or more original source code instructions that are configured to achieve an expected result when executed by a web browser on the client computer; applying an obfuscation transformation to the one or more original source code instructions, to produce one or more obfuscated source code instructions that are configured to achieve the same expected result when executed by the web browser but is expressed in an obfuscated format; communicating the one or more obfuscated source code instructions to the web browser of the client computer.

Embodiments discussed herein provide numerous benefits and improvements over the general idea of increasing the resistance of servers to reverse engineering, spoofing, and cracking. Unauthorized reuse of scripts or data is made more difficult. Human analysis is thwarted by reducing the readability of scripts.

2.0 COMPUTER SYSTEM FOR SCRIPT OBFUSCATION

FIG. 1 illustrates functional units of a computer system that is configured to improve security of server computers interacting with client computers. Computer system 100 may be a rack server, a personal computer, a virtual computing instance hosted in a private datacenter or reconfigurable cloud-based datacenter, or any computer able to transfer a computer source code between a memory and a processor and apply transformations to the source code. Computer system 100 comprises source code obfuscation logic 130 coupled to processor 120, and memory 110 which is also coupled to processor 120.

Memory 110 may be a volatile random access memory (RAM), a non-volatile flash memory, or any memory device able to read and write digital data. Memory 110 may store original source code instructions 140. Original source code instructions 140 are configured to achieve an expected result when executed by a web browser on a client computer. Original source code instructions 140 may be a text encoding of statements expressed in a web browser scripting language such as JavaScript, ActionScript, Dart, VBScript, Typescript, Ruby, or Python.

Processor 120 may be a central processing unit, a microprocessor, or other instruction processing device. Processor 120 is coupled to or executes source code obfuscation logic 130, perhaps after reading source code obfuscation logic 130 from memory 110. Source code obfuscation logic 130 includes processing instructions that cause processor 120 and memory 110 to perform obfuscation transformations 150. Obfuscation transformations 150 reconfigure source code instructions from one form into another form that distorts the structure of the source code without altering the effects of the source code. In various embodiments, source code obfuscation logic 130 and/or obfuscation transformations 150 may be implemented using one or more computer programs or other software elements, firmware in read-only memory, one or more FPGAs or ASICs, or in other hardware logic. Computer system 100 may, in one embodiment, comprise a special-purpose computer, or may be implemented using a general purpose computer into which instructions are loaded and executed to thereby program the computer to perform the functions described herein.

In operation, at time T1, source code obfuscation logic 130 causes processor 120 to read original source code instructions 140 from memory 110. At time T2, source code obfuscation logic 130 causes processor 120 to apply obfuscation transformations 150 to original source code instructions 140, which produces obfuscated source code instructions 160. Obfuscated source code instructions 160 are expressed in a same scripting language as original source code instructions 140. Obfuscated source code instructions 160 are expressed in an obfuscated format that makes interpretation by a human difficult. Although obfuscated source code instructions 160 and original source code instructions 140 are structurally different, either of source code instructions 140 or 160 achieves the same result when executed by a web browser on a client computer. At time T3, source code obfuscation logic 130 causes processor 120 to write obfuscated source code instructions 160 into memory 110.

Although source code obfuscation logic 130 may have many obfuscation transformations 150 available, the applicability of an individual transformation may depend on the presence of an identifiable pattern in original source code instructions 140. Consequently, for a given original source code instructions 140, in some embodiments only a subset of obfuscation transformations 150 may be applied.

Each of obfuscation transformations 150 may be applied, if at all, in sequence. Obfuscated source code instructions 160 produced by one transformation may be used as original source code instructions 140 for a subsequent transformation.

Because a transformation is applied to an identified pattern, and restructuring caused by other transformations already applied may create or destroy that pattern, different obfuscated source code instructions 160 may be achieved depending on a particular sequential ordering of obfuscation transformations 150. A single pass by source code obfuscation logic 130 over original source code instructions 140 may exhaustively apply an individual transformation to all occurrences of a pattern. However because other subsequent transformations may cause new instances of that pattern to appear, a repeated pass with the individual transformation may yield different obfuscated source code instructions 160.

For purposes of illustrating a clear example, FIG. 1 shows a single instance of computer system 100, logic 130 and transformations 150, but in other embodiments, multiple instances may be used. For example, computer system 100 may be implemented using a large number of similar instances of processor 120, memory 110, and logic 130 that operate in parallel and/or for scalability and load balancing purposes.

3.0 EXAMPLE SCRIPT OBFUSCATION PROCESS DETAILS

Figure 2:
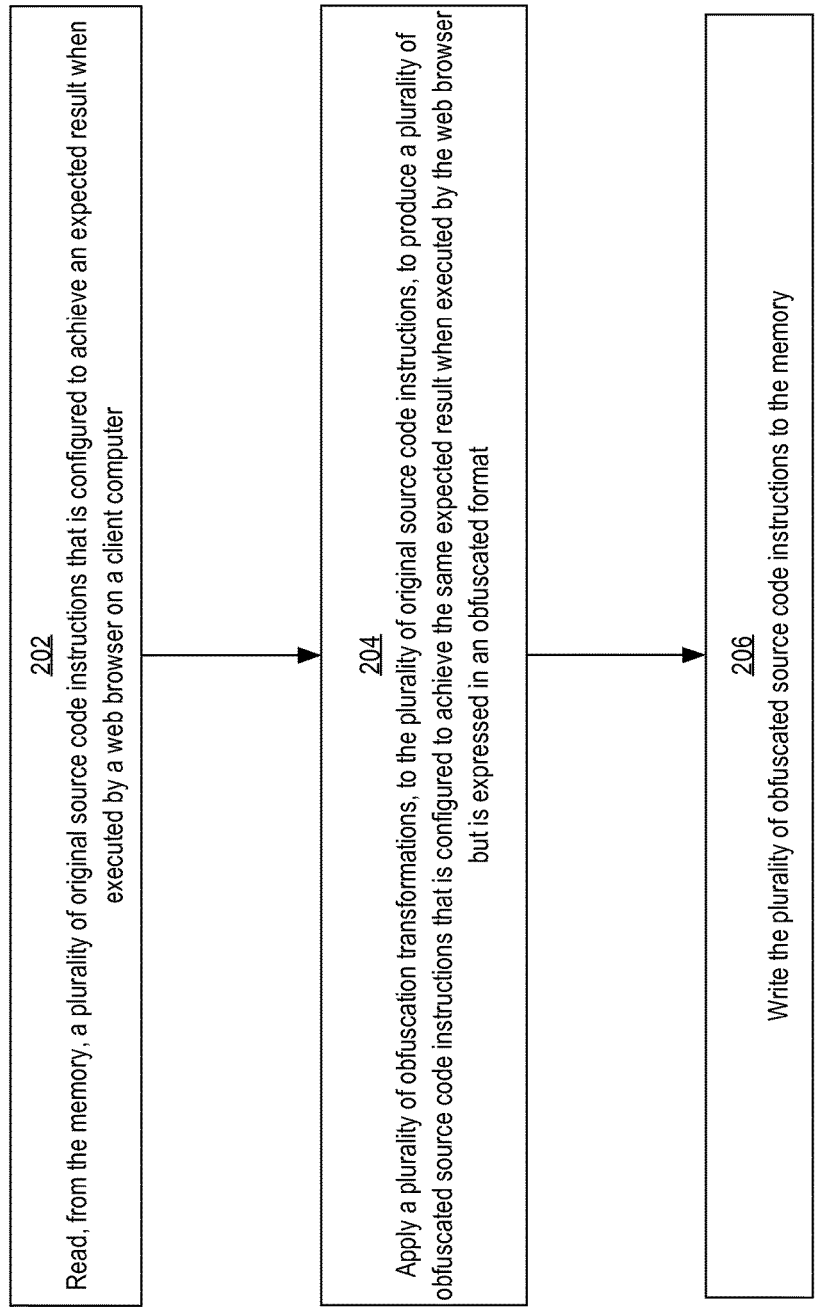
FIG. 2 illustrates a process for improving security of server computers interacting with client computers.

FIG. 2 illustrates a process for improved security of server computers interacting with client computers, in an example embodiment. For purposes of illustrating a clear example, FIG. 2 may be described with reference to FIG. 1, but using the particular arrangements illustrated in FIG. 1 is not required in other embodiments.

In step 202, a computer reads original source code from memory. For example, original source code instructions 140 reside in memory 110 and are configured to achieve an expected result when executed by a web browser on a client computer. Memory 110 earlier may have received original source code instructions 140 from an upstream source, such as a web server, or from a file system. Source code obfuscation logic 130 causes processor 120 to read original source code instructions 140 from memory 110. Source code obfuscation logic 130 may marshal original source code instructions 140 into intermediate data structures as a preface to applying obfuscation transformations 150. Source code obfuscation logic 130 may scan original source code instructions 140 into tokens. Source code obfuscation logic 130 may parse original source code instructions 140 into an abstract syntax tree. Source code obfuscation logic 130 may annotate original source code instructions 140 with semantic analysis.

In step 204, the computer applies obfuscation transformations. For example, source code obfuscation logic 130 may apply each of obfuscation transformations 150 in sequence. For each of obfuscation transformations 150, source code obfuscation logic 130 may identify instances of a pattern in original source code instructions 140 that match the input requirements of the transformation being applied. Source code obfuscation logic 130 applies each transformation in sequence to produce obfuscated source code instructions 160. The output of each transformation may be a syntax tree, a token stream, or actual source code instructions in obfuscated form.

In step 206, the computer writes obfuscated source code into memory. For example, source code obfuscation logic 130 may serialize an intermediate data structure into obfuscated source code instructions 160. Source code obfuscation logic 130 writes obfuscated source code instructions 160 into memory 110. Obfuscated source code instructions 160 may be buffered in memory 110 before being written to a file system or transmitted to a web browser on a client computer.

Using this approach, computer system 100 achieves source code obfuscation that exceeds prior techniques for confusing humans and automation that attempt reverse engineering or exploit discovery.

4.0 EXAMPLE NETWORK TOPOLOGY

Figure 3:
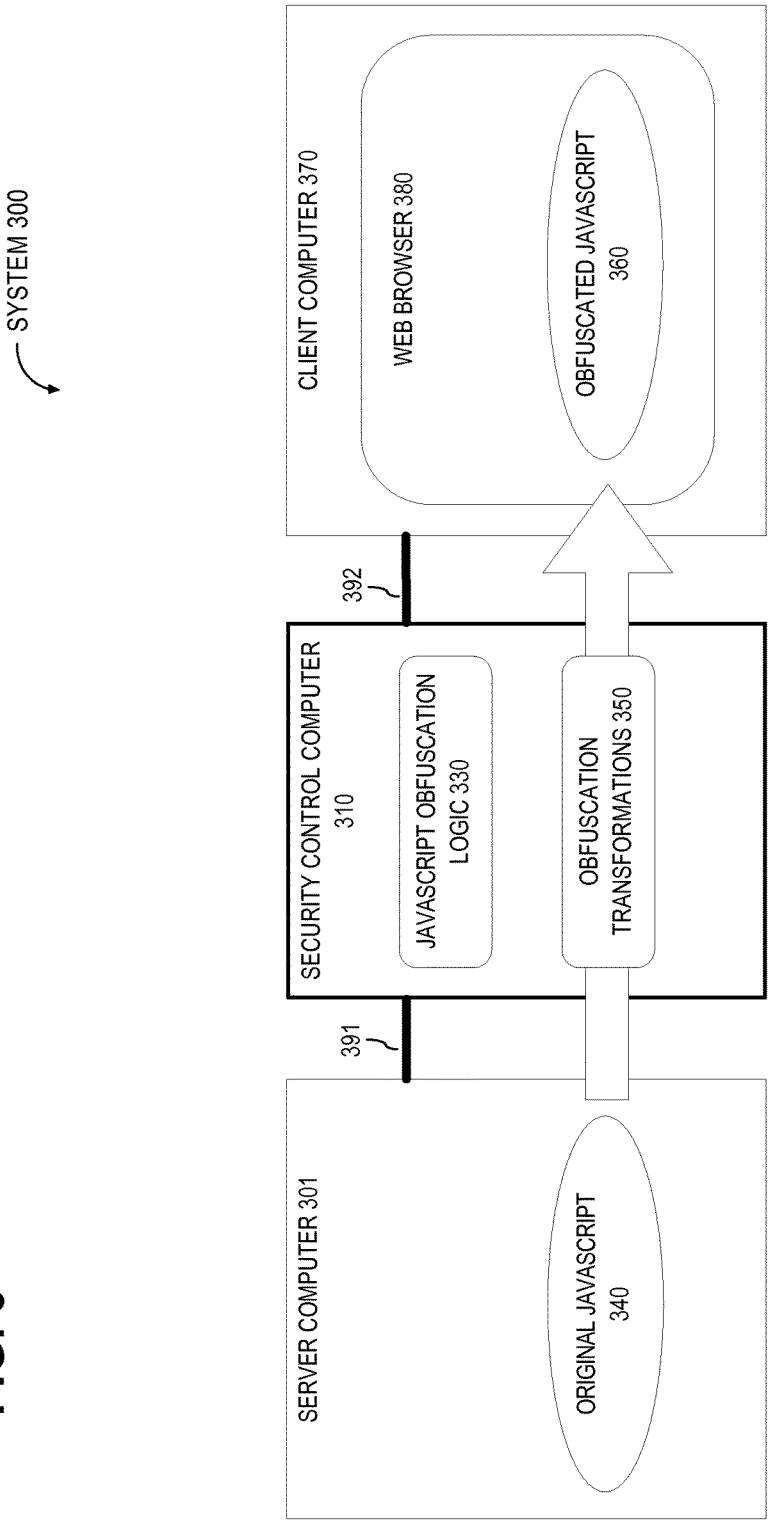
FIG. 3 illustrates a network system that is configured to improve security of server computers interacting with client computers.

FIG. 3 illustrates a network system that is configured to improve security of server computers interacting with client computers. In the example of FIG. 3, network system 300 includes server computer 301, security control computer 310, client computer 370, and network links 391-392. Each of network links 391-392 may be an individual network link, such as an optical fiber, a copper cable, a wireless link, or a backplane wire. Each of network links 391-392 may instead be an aggregation of network links and other network elements such as a local area network (LAN) or an internetwork of networks, such as the Internet. Content sent of either of network links 391-392 may be delivered according to a transport protocol such as hypertext transfer protocol (HTTP) or HTTP secure (HTTPS). Network link 391 connects security control computer 310 with server computer 301.

Each of security control computer 310 and server computer 301 may be a web server, a rack server, a personal computer, or other networked computer. An implementation may combine security control computer 310 and server computer 301 into a single computer. Security control computer 310 may be an implementation of computer system 100, although computer system 100 may have other implementations.

Client computer 370 may be a personal computer, a smart phone, or any networked computer that executes a web browser. Client computer 370 executes web browser 380 that may load web pages and scripts from other networked computers, such as web servers. Web browser 380 may be any software component that processes web content and execute scripts that it receives. Web browser 380 may run as a standalone browser application or be embedded within a dedicated software application. Web browser 380 may render a web page that it receives or process web content in a headless manner.

Server computer 301 may contain original JavaScript 340. Although JavaScript is used for browser scripting in this example, other browser scripting languages are suitable for use with the same techniques. Server computer 301 may dynamically generate original JavaScript 340 or load it from a file system. Original JavaScript 340 may be part of a web page. Server computer 301 may be configured to transmit original JavaScript 340 to security control computer 310. Alternatively, server computer 301 may be configured to transmit original JavaScript 340 to client computer 370. However, security control computer 310 is topologically interposed between server computer 301 and client computer 370. In either case, server computer 301 transmits original JavaScript 340, perhaps encapsulated within a web page, over network link 391 to security control computer 310.

Security control computer 310 includes JavaScript obfuscation logic 330 and obfuscation transformations 350. JavaScript obfuscation logic 330 may be an implementation of source code obfuscation logic 130, although source code obfuscation logic 130 may have other implementations. Security control computer 310 executes JavaScript obfuscation logic 330 to apply obfuscation transformations 350 to original JavaScript 340. In this example, obfuscation transformations 350 include many independent transformations that may be applied.

JavaScript obfuscation logic 330 may transform original JavaScript 340 into obfuscated JavaScript 360. Obfuscated JavaScript 360 may be an implementation of obfuscated source code instructions 160, although obfuscated source code instructions 160 may have other implementations. JavaScript obfuscation logic 330 transmits obfuscated JavaScript 360, perhaps encapsulated within a web page, over network link 392 to client computer 370 which may execute obfuscated JavaScript 360 in web browser 380.

Using this approach, security control computer 310 delivers JavaScript exceeding prior levels of security. With increased security comes the possibility of safely shifting more functionality from server 301 to client computer 370, thereby increasing scalability and decreasing energy consumption by a data center.

5.0 EXAMPLE OBFUSCATION TRANSFORMATIONS

In various embodiments, source code obfuscation logic 130 implements, as the obfuscation transformations 150, one or more of the obfuscation transformations that are described in this section. Any one or more of these obfuscations may be combined, such that a statement may be obfuscated by multiple transformations. For purposes of illustrating clear examples, script source code snippets set forth in this section show JavaScript, but in other embodiments, the obfuscations described in this section are applicable to other scripting languages. The statements in this section may serve as a functional specification and/or design specification that a skilled programmer, software engineer, and/or computer engineer may use to implement an embodiment using any suitable programming development environment, programming language, digital logic, or other computer elements. Thus, this section may serve as an example of steps that may be used for implementing the claimed functions recited in the claims and are provided in sufficient detail such that one skilled in the art would know how to program a microprocessor or computer to perform the steps of the claims in any of various embodiments.

5.1 Unobtrusive Obfuscations

Some obfuscation transformations do not alter the structure of a script. Examples include peephole obfuscations that can be applied to an individual statement without consideration of interdependencies that involve surrounding statements.

5.1.1 Numeric Expression Substitution

An integer literal is a more human readable way to define a number. A less readable way is to define an expression that calculates the number when executed in web browser 380. The expression may include operators, literal operands, and symbolic operands. According to a numeric expression substitution obfuscation of obfuscation transformations 350, JavaScript obfuscation logic 330 may scan original JavaScript 340 for occurrences of an integer literal. JavaScript obfuscation logic 330 may find a snippet of JavaScript such as Original Snippet 1.

Original Snippet 1:
line 01: tries=6;
line 02: skill=0;

When processing Original Snippet 1, JavaScript obfuscation logic 330 may apply a transformation that replaces integer literals "6" and "0" with an expression that uses a different literal to achieve the same result when executed in web browser 380. Such a transformation yields Obfuscated Snippet 1. Implementations of JavaScript obfuscation logic 330 may use different literals and operators to compose the expression.

Obfuscated Snippet 1:
line 01: tries=2*Number.MIN_VALUE/
line 02: Number.MIN_VALUE*3;
line 03: skill=~~";

5.1.2 Literal Deconstruction

A string literal is a more human readable way to define a character string. A less readable way is to define a concatenation of substrings that assembles the character string when executed in web browser 380. According to literal deconstruction obfuscation of obfuscation transformations 350, JavaScript obfuscation logic 330 may scan original JavaScript 340 for occurrences of a string literal. JavaScript obfuscation logic 330 may find a snippet of JavaScript such as Original Snippet 2.

Original Snippet 2:
line 01: title="Today's Important Headlines";

When processing Original Snippet 2, JavaScript obfuscation logic 330 may apply a transformation that decomposes the string literal into substrings that are concatenated to achieve the same result when executed in web browser 380. Such a transformation yields Obfuscated Snippet 2. Implementations of JavaScript obfuscation logic 330 may use different heuristics for deciding at which points to sever the string literal into substrings. For example the substrings may have identical or random lengths. An implementation may define substrings that each are composed of only vowels, only consonants, or only punctuation. For example no substring of Obfuscated Snippet 2 has both a vowel and a consonant.

Obfuscated Snippet 2:
line 01: title="T"+"o"+"d"+"ay'"+
line 02: "s"+"I"+"mp"+"o"+"rt"+"a"+
line 03: "nt
   H"+"ea"+"dl"+"i"+"n"+"e"+"s";

String assembly by a concatenation operator is not the only way to perform literal deconstruction obfuscation. Passing an array of substrings to a join function may accomplish the same obfuscation in a different way. The join function may achieve greater obfuscation because it allows removal of a common character from the substrings. An implementation may scan a string literal to discover a most frequent character and then use that character as a separator with which to split the string literal into substrings that lack that character. JavaScript obfuscation logic 330 may find a snippet of JavaScript such as Original Snippet 3.

Original Snippet 3:
line 01: title="Today's Important Headlines";

When processing Original Snippet 3, JavaScript obfuscation logic 330 may use an "a" character as a separator to split the string literal into substrings that are joined to achieve the same result when executed in web browser 380. Such a transformation yields Obfuscated Snippet 3.

Obfuscated Snippet 3:
line 01: title=["Tod","y's Import",
line 02: "nt He", "dlines"].join("a");

5.1.3 Visually Similar Identifiers

A JavaScript identifier may be composed by selecting letters from hundreds of strange Unicode letters. A distinct and meaningful name is a more human readable way of declaring a variable. A less readable name is meaningless and similar to other variable names. According to visually similar identifiers obfuscation of obfuscation transformations 350, JavaScript obfuscation logic 330 may scan original JavaScript 340 for occurrences of a variable name. JavaScript obfuscation logic 330 may find a snippet of JavaScript such as Original Snippet 4.

Original Snippet 4:
line 01: subject="This web page";
line 02: verb="works";
line 03: sentence=subject+verb+".";

When processing Original Snippet 4, JavaScript obfuscation logic 330 may use visually similar names to rename variables to achieve the same result when executed in web browser 380. Such a transformation yields Obfuscated Snippet 4. Implementations of JavaScript obfuscation logic 330 may generate a variable name by repetition of a few base letters. Repetition reduces readability because a human has difficulty distinguishing between two variable names composed of the same repeating letter, but repeated different amounts. Occurrences of a base letter may modified by adding a diacritic. Diacritics reduce readability because they are unfamiliar and visually subtle. Diacritics may be drawn from multiple natural languages to ensure unfamiliarity.

Obfuscated Snippet 4:
line 01: ίĩίíίĩíί="This web page";
line 02: ίĩíίĩíί="works";
line 03: ίĩíίĩĩί=ίĩίίĩíί+ίĩíĩíί+".";

5.2 Decoy Statements

Web browser 380 need not execute every statement within obfuscated JavaScript 360. Obfuscated JavaScript 360 may contain unreachable statements that cannot be executed and exist only to distract a human reader. Unreachable statements may include arbitrary expressions. To further decrease readability, unreachable statements may include duplicates of statements from original JavaScript 340.

5.2.1 Duplicate Code Injection

JavaScript obfuscation logic 330 may cause a duplicate statement to be unreachable by enclosing the duplicate statement within a control flow statement that includes a condition that always evaluates as false. According to a duplicate code injection of obfuscation transformations 350, JavaScript obfuscation logic 330 may scan original JavaScript 340 for occurrences of statements. JavaScript obfuscation logic 330 may find a snippet of JavaScript such as Original Snippet 5.

Original Snippet 5:
line 01: banner=document.getElementById("top");
line 02: parent=banner.parent;
line 03: parent.style.display="none";

When processing Original Snippet 5, JavaScript obfuscation logic 330 may clone lines 01-03 and embed the cloned lines within a statement block that is unreachable. Such a transformation yields Obfuscated Snippet 5. Although the unreachable statements are shown adjacent to the original statements, adjacency may be avoided. The conditional expression that guards the unreachable block may be subjected to others of obfuscation transformations 350.

Obfuscated Snippet 5:
line 01: banner=document.getElementById("top");
line 02: parent=banner.parent;
line 03: parent.style.display="none";
line 04: if (null==this) {
line 05: banner=document.getElementById("top");
line 06: parent=banner.parent;
line 07: parent.style.display="none";}

5.2.2 Distractor Functions

JavaScript obfuscation logic 330 may cause a duplicate statement to be unreachable by enclosing the duplicate statement within a function that is not invoked. According to a distractor functions obfuscation of obfuscation transformations 350, JavaScript obfuscation logic 330 may scan original JavaScript 340 for function definitions. JavaScript obfuscation logic 330 may find a snippet of JavaScript such as Original Snippet 6.

Original Snippet 6:
line 01: function find(a,b) {
line 02: return a.getElementById (b);}

When processing Original Snippet 6, JavaScript obfuscation logic 330 may clone function "find" and rename the clone. Such a transformation yields Obfuscated Snippet 6. Although the function clone is shown adjacent to the original function, adjacency may be avoided. Human readability may be reduced by using a variation of the original name when renaming the clone. A web page may include dynamic content, which requires that the web page be regenerated every time it is requested. Reverse engineering may involve repeated requests for a regenerated web page. During each regeneration, JavaScript obfuscation logic 330 may move the original function to a different location within obfuscated JavaScript 360 to further confuse human analysis tasks, such as interactive debugging. For example original JavaScript 340 may include a statement followed by the original function, whereas the relative ordering of the statement and the original function may be reversed in obfuscated JavaScript 360. Some user defined functions are especially important, either to the JavaScript interpreter or to the web browser. Obfuscating an important function may be a strategic way to thwart human analysis. For example a constructor, a document object model event listener, or a timer handler are functions that are ripe for obfuscation such as cloning.

Obfuscated Snippet 6:
line 01: function find(a,b) {
line 02: return a.getElementById(b);}
line 03: function finb(a,b) {
line 04: return a.getElementById(b);}

5.3 Object Oriented Obfuscation Transformations

Modern scripting languages are object oriented. Herein are obfuscations that are designed to reduce the readability of object oriented scripts.

5.3.1 Property Obfuscation

A JavaScript object keeps data in properties. JavaScript has alternate ways of accessing a property. Dot notation is a more human readable way to access a property directly by a name of the property. Bracket notation with a string literal is less readable because it requires four punctuation characters, while dot notation requires only one punctuation character. According to an object property obfuscation of obfuscation transformations 350, JavaScript obfuscation logic 330 may scan original JavaScript 340 for occurrences that access a named property of a JavaScript object. For example, JavaScript obfuscation logic 330 may find a snippet of JavaScript in which a "years" property of a "person" object is accessed, such as line 01 of Original Snippet 7. Line 01 involves a data property. Line 02 shows a similar example, but with a function property.

Original Snippet 7:
line 01: age=person.years;
line 02: person.talk( );

When processing Original Snippet 7, JavaScript obfuscation logic 330 may apply a transformation that replaces direct access of the "years" and "jump" properties with a property access that uses a string literal to achieve the same result when executed in web browser 380. Such a transformation yields Obfuscated Snippet 7.

Obfuscated Snippet 7:
line 01: age=person ["years"];
line 02: person ["talk"]( );

5.3.2 Object Literal Obfuscation

JavaScript object notation (JSON) is a more human readable way to define an object instance. JSON combines object instantiation and property initialization into a single statement. A less readable way is to decouple instantiation and initialization by initializing each property in a separate statement to achieve the same result when executed in web browser 380. According to an object literal obfuscation of obfuscation transformations 350, JavaScript obfuscation logic 330 may scan original JavaScript 340 for occurrences of an object literal. JavaScript obfuscation logic 330 may find a snippet of JavaScript such as Original Snippet 8.

Original Snippet 8:
line 01: person={name:"Joe Donut", job:"Baker"};

When processing Original Snippet 8, JavaScript obfuscation logic 330 may instantiate an empty object instance and place each property initialization in a separate statement to achieve the same result when executed in web browser 380. Such a transformation yields Obfuscated Snippet 6. Although the object instantiation and property initializations are shown on adjacent lines, adjacency is not required and may be avoided to decentralize initialization. An implementation may also rely on automatic declaration hoisting within a JavaScript scope to further hide the object instantiation.

Obfuscated Snippet 8:
line 01: person={ };
line 02: person.name="Joe Donut";
line 03: person.job="Baker";

5.4 Obfuscation Transformations that Generate Functions

Obfuscation is an example of logic refactoring. Many refactorings are accomplished by introducing a function. Obfuscated JavaScript 360 may define a function that is not defined in original JavaScript 340. Obfuscated JavaScript 360 may also invoke the function. The definition and invocation of the function may occur in adjacent statements or may be separated by other statements to decrease human readability. The name of the function may be similar to the name of another function to decrease human readability.

5.4.1 Code Extraction

Directly in line is a more human readable way to use an expression. A less readable way is to extract the expression into a function and invoke the function to achieve the same result when executed in web browser 380. According to a code extraction obfuscation of obfuscation transformations 350, JavaScript obfuscation logic 330 may scan original JavaScript 340 for occurrences of an expression. JavaScript obfuscation logic 330 may find a snippet of JavaScript such as Original Snippet 9.

Original Snippet 9:
line 01: perimeter=2*(width+height);

When processing Original Snippet 9, JavaScript obfuscation logic 330 may extract the right hand side of the equation into a function and then invoke the function to achieve the same result when executed in web browser 380. Such a transformation yields Obfuscated Snippet 9. Although the definition and invocation of the function are shown on adjacent lines, adjacency is not required and may be avoided to hide the function definition. An implementation may also rely on automatic declaration hoisting within a JavaScript scope to further hide the function declaration. Depending on the placement of the function definition, the signature of the function may need arguments for variables used in the extracted expression.

Obfuscated Snippet 9:
line 01: function foo( ) {
line 02: return 2*(width+height);}
line 03: perimeter=foo( );

5.4.2 Recursive Function Injection

An integer literal is a more human readable way to define a number. A less readable way is to define a recursive function that when invoked with particular argument values may achieve the same result when executed in web browser 380. According to a recursive function injection obfuscation of obfuscation transformations 350, JavaScript obfuscation logic 330 may scan original JavaScript 340 for occurrences of an integer literal. JavaScript obfuscation logic 330 may find a snippet of JavaScript such as Original Snippet 10.

Original Snippet 10:
line 01: age=9;

When processing Original Snippet 10, JavaScript obfuscation logic 330 may define a recursive function having a counter parameter and an accumulator parameter to achieve the same result when executed in web browser 380. Such a transformation yields Obfuscated Snippet 10. When invoked with particular values for the counter and the accumulator, the function may recursively decrement the counter until zero. Each recursive invocation of the function may adjust the accumulator by a specific amount. Although the definition and invocation of the recursive function are shown on adjacent lines, adjacency is not required and may be avoided to hide the function definition.

Obfuscated Snippet 10:
line 01: function recurs(counter,accumulator) {
line 02: if (0==counter) return accumulator;
line 03: return recurs(counter−1, accumulator+2);}
line 04: age=recurs(6,−3);

5.4.3 Immediately-Invoked Function Expression

A literal is a more human readable way to use a value. A less readable way is to define a closure that returns the value when invoked in web browser 380. According to an immediately-invoked function expression obfuscation of obfuscation transformations 350, JavaScript obfuscation logic 330 may scan original JavaScript 340 for occurrences of a literal. The literal may be number, a string, or an object. JavaScript obfuscation logic 330 may find a snippet of JavaScript such as Original Snippet 11.

Original Snippet 11:
line 01: age=9;

When processing Original Snippet 11, JavaScript obfuscation logic 330 may define a JavaScript immediately-invoked function expression to achieve the same result when executed in web browser 380. Such a transformation yields Obfuscated Snippet 11.

Obfuscated Snippet 11:
line 01: age=(function( ){return 9;} ( ));

5.5 Document Object Model Awareness

Web browser scripting is the primary use of JavaScript. Web browsers employ special application programming interfaces (API) to provide intimate access to web page internals or browser machinery. Web page internals are exposed by the document object model (DOM). Browser machinery is exposed by the browser object model (BOM). Obfuscation transformations 350 may include transformations that apply only to usage of these dedicated APIs.

5.5.1 Predefined Object Aliasing

The BOM predefines important objects. An official name of a predefined object is a more human readable way to reference the predefined object. A less readable way is to define and use an alias of the predefined object to achieve the same result when executed in web browser 380. Obfuscating a predefined object may be a strategic way to thwart human analysis. According to a predefined object aliasing of obfuscation transformations 350, JavaScript obfuscation logic 330 may scan original JavaScript 340 for occurrences of a predefined object. JavaScript obfuscation logic 330 may find a snippet of JavaScript such as Original Snippet 12.

Original Snippet 12:
line 01: document.write(status);

When processing Original Snippet 12, JavaScript obfuscation logic 330 may declare and use a variable that references a predefined object to achieve the same result when executed in web browser 380. Such a transformation yields Obfuscated Snippet 12. The "window" object is a special case that in many circumstances may be implicitly synonymous with the "this" keyword. The "this" keyword may also be omitted in many circumstances. Although the declaration and use of the aliases are shown on adjacent lines, adjacency is not required and may be avoided to hide an alias declaration. Automatic JavaScript hoisting may also be used to further hide an alias declaration.

Obfuscated Snippet 12:
line 01: var alias1=document, alias2=this;
line 02: alias1.write(alias2.status);

5.5.2 BOM Enumeration

The BOM predefines a containment hierarchy of named objects arranged according to relationships between parent and children objects. Accessing a BOM object by name is a more human readable way to reference the BOM object. A less readable way is to iterate over the siblings of a BOM object to obtain a reference to the BOM object to achieve the same result when executed in web browser 380. According to a BOM enumeration obfuscation of obfuscation transformations 350, JavaScript obfuscation logic 330 may scan original JavaScript 340 for occurrences of a BOM object. JavaScript obfuscation logic 330 may find a snippet of JavaScript such as Original Snippet 13.

Original Snippet 13:
line 01: document.write ("hello");

When processing Original Snippet 13, JavaScript obfuscation logic 330 may refer to the "window" object as the parent of the "document" object and iterate over the names of children of "window" to find a reference to the "document" to achieve the same result when executed in web browser 380. Such a transformation yields Obfuscated Snippet 13. Although only one level of children in the BOM hierarchy is shown in Obfuscated Snippet 13, an implementation may enumerate and traverse multiple levels of the BOM hierarchy. The criteria by which the desired child is detected during enumeration depend on arbitrary, but invariant, aspects of uniqueness of a named child. Criteria may include the name of the child or other properties of the child that distinguish the child from its siblings. In Obfuscated Snippet 13, the characters of the name of the child are sampled.

Obfuscated Snippet 13:
line 01: for (childName in window)
line 02: if (8==childName.length &&
line 03: 100=childName.charCodeAt(0) &&
line 04: 116==childName.charCodeAt(7))
line 05:
   window[childName].write("hello");

6.0 IMPLEMENTATION MECHANISMS

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
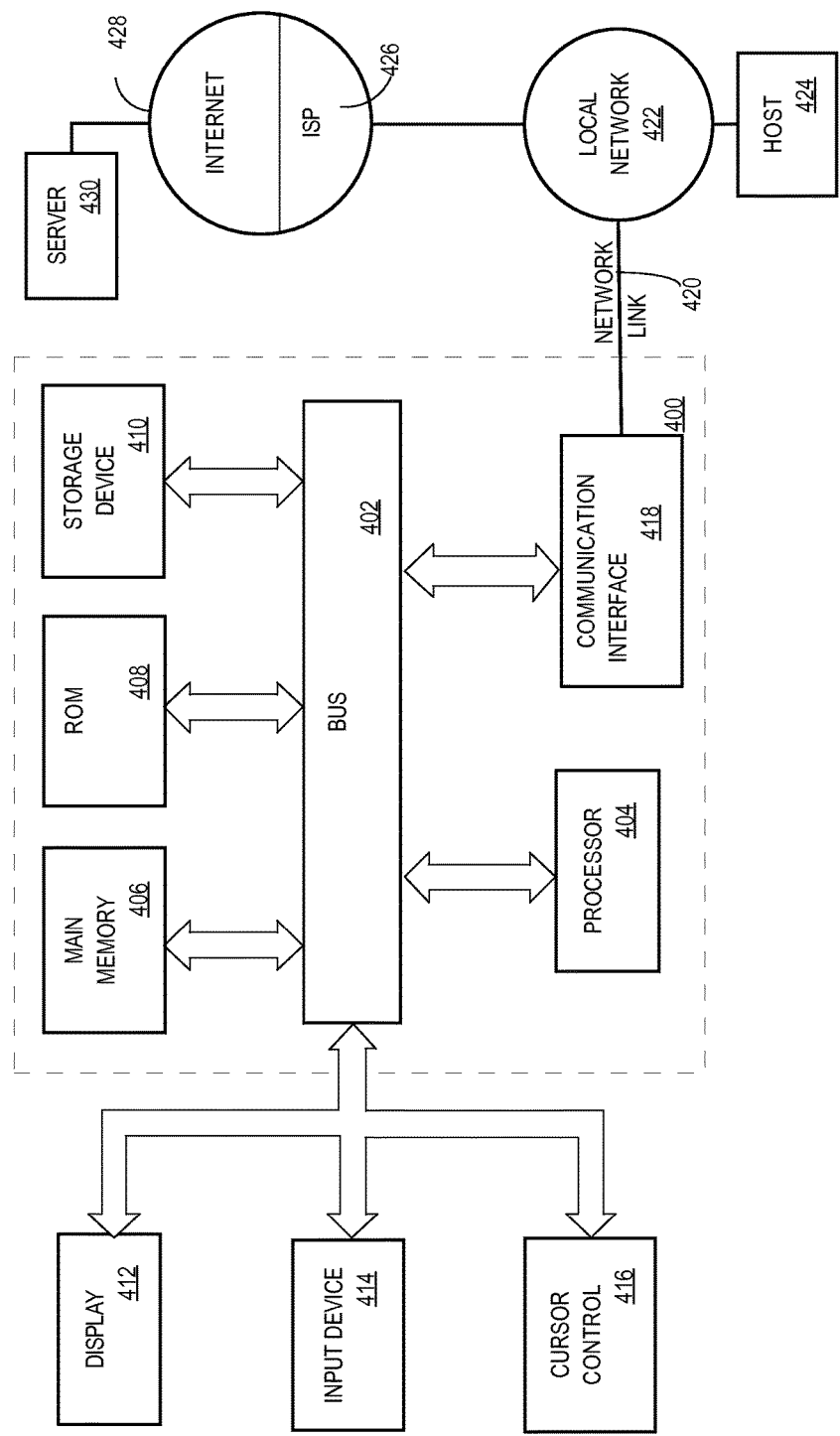
FIG. 4 illustrates a computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

7.0 OTHER ASPECTS OF DISCLOSURE

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer system configured to improve security of server computers interacting with client computers, and comprising:
   a memory;
   a processor coupled to the memory; and
   source code obfuscation logic coupled to the memory and the processor, and configured to:
   read, from the memory, one or more original source code instructions that are configured to achieve an expected result when executed by a web browser on a client computer;
   apply one or more obfuscation transformations, to the one or more original source code instructions, to produce one or more obfuscated source code instructions that are configured to achieve the same expected result when executed by the web browser but is expressed in an obfuscated format; and
   write the one or more obfuscated source code instructions to the memory;
   wherein the one or more original source code instructions comprise a literal;
   wherein the one or more obfuscated source code instructions comprise a statement defining a closure having a body that is configured to return the literal when executed by the web browser and an invocation of the closure, and which is configured to achieve the expected result when executed by the web browser.

2. The computer system of claim 1 wherein the statement comprises a JavaScript immediately-invoked function expression.

3. The computer system of claim 1 wherein the one or more original source code instructions comprise a literal comprising a string value;
   wherein apply an obfuscation transformation comprises split the string value into a plurality of sub strings; and
   wherein the one or more obfuscated source code instructions comprise, configured to evaluate to the string value when executed by the web browser, an expression to concatenate the sub strings.

4. The computer system of claim 3 wherein split the string value comprises:
   select the most frequent character in the string value;
   split the string value into a plurality of sub strings that lack the most frequent character; and
   wherein an expression to concatenate comprises an expression to concatenate the sub strings joined by the most frequent character.

5. The computer system of claim 1 wherein the one or more original source code instructions comprise an access of a member of an object;
   wherein the one or more obfuscated source code instructions comprise a string literal comprising a name of the member; and
   wherein to achieve the expected result when executed by the web browser, the one or more obfuscated source code instructions are configured to use the string literal to access the member.

6. A computer system configured to improve security of server computers interacting with client computers, and comprising:
   a memory;
   a processor coupled to the memory; and
   source code obfuscation logic coupled to the memory and the processor, and configured to:
   read, from the memory, one or more original source code instructions that are configured to achieve an expected result when executed by a web browser on a client computer;
   apply one or more obfuscation transformations, to the one or more original source code instructions, to produce one or more obfuscated source code instructions that are configured to achieve the same expected result when executed by the web browser but is expressed in an obfuscated format; and
   write the one or more obfuscated source code instructions to the memory;

wherein the one or more original source code instructions comprise an access of a particular member of a target element of a document object model (DOM);

wherein the one or more obfuscated source code instructions are configured to:

identify a parent element of the target element, the parent element having a plurality of named members each having a member name;

from the plurality of member names of the parent element, select a matching name that matches a name of the target element;

use the matching name to access a member of the parent element to select a child element; and access the particular member of the child element to achieve the expected result when executed by the web browser.

7. A computer-implemented method for improving security of a server computer that is configured to deliver computer program source code to a client computer, and comprising, using a security control computer that is topologically interposed between the server computer and the client computer:

obtaining, from the server computer, one or more original source code instructions that are configured to achieve an expected result when executed by a web browser on the client computer;

applying an obfuscation transformation to the one or more original source code instructions, to produce one or more obfuscated source code instructions that are configured to achieve the same expected result when executed by the web browser but is expressed in an obfuscated format;

communicating the one or more obfuscated source code instructions to the web browser of the client computer;

obtaining the one or more original source code instructions in a payload of a first hypertext transfer protocol (HTTP) response to the server computer to an earlier HTTP request of the client computer, and communicating the one or more obfuscated source code instructions to the web browser of the client computer in a second HTTP response on behalf of the server computer.

8. A computer system for improving security and comprising:

a server computer;

a security control computer that is topologically interposed between the server computer and a client computer, and configured to:

obtain, from the server computer, one or more original source code instructions that are configured to achieve an expected result when executed by a web browser on the client computer;

apply an obfuscation transformation to the one or more original source code instructions, to produce one or more obfuscated source code instructions that are configured to achieve the same expected result when executed by the web browser but is expressed in an obfuscated format;

communicate the one or more obfuscated source code instructions to the web browser of the client computer;

obtain the one or more original source code instructions in a payload of a first networking protocol response to the server computer to an earlier networking protocol request of the client computer, and communicate the one or more obfuscated source code instructions to the web browser of the client computer in a second networking protocol response on behalf of the server computer.

9. The computer system of claim 8 wherein the one or more original source code instructions define an object having a non-empty object literal that is configured to assign a value to a member of the object; and wherein the one or more obfuscated source code instructions comprise a first assignment expression that is configured to assign an empty object literal to a variable, and a second assignment expression that is configured to assign the value to the member and that will achieve the expected result when executed by the web browser.

10. The computer system of claim 8 wherein the one or more original source code instructions comprise a first assignment expression configured to assign a number to a variable;

wherein the one or more obfuscated source code instructions comprise:

a definition of a recursive function comprising a counter parameter and an accumulator parameter, and configured to apply an operation to the accumulator parameter; to recursively execute as many times as a value of the counter parameter; to return a value of the accumulator parameter; and a second assignment expression configured to perform an invocation of the recursive function, and to achieve the expected result when executed by the web browser, to assign to the variable a value returned by the invocation.

11. The computer system of claim 8 wherein the one or more original source code instructions reference a browser object model (BOM) object;

wherein the one or more obfuscated source code instructions comprise:

an assignment of the BOM object to a variable; and an expression comprising the variable, and configured to achieve the expected result when executed by the web browser.

12. The computer system of claim 8 wherein the one or more original source code instructions comprise a first definition of a first function comprising a first name and a body;

wherein the one or more obfuscated source code instructions comprise:

the first definition; and a second definition of a second function comprising a second name and a clone of the body.

13. The computer system of claim 12 wherein the one or more original source code instructions further comprises a statement after the first definition, and the first definition is after the statement.

14. The computer system of claim 12 wherein the first function is one of a constructor, a DOM event listener, and a timer handler.

15. The computer system of claim 8 wherein the one or more original source code instructions comprise a first statement;

wherein the one or more obfuscated source code instructions comprise:

the first statement; and a control flow statement comprising a condition configured to evaluate to false when executed by the web browser, and an unreachable body comprising a clone of the first statement.

16. The computer system of claim 8 wherein the one or more original source code instructions comprise an expression;
  wherein the one or more obfuscated source code instructions comprise:
  a first statement comprising a definition of a function comprising the expression and configured to return a value returned by the expression; and
  a second statement, comprising an invocation of the function, which is configured to achieve the expected result when executed by the web browser.

17. The computer system of claim 8 wherein the one or more original source code instructions comprise a use of a variable and a declaration of the variable, the variable comprising an original name;
  wherein apply an obfuscation transformation comprises:
  determine a base name comprising a repetition of a letter;
  modify a clone of the base name by adding a diacritic to each letter of the repetition to produce a modified name;
  wherein the one or more obfuscated source code instructions comprise:
  a modified clone of the declaration comprising a substitution of the modified name for the original name; and
  a modified clone of the use, comprising a substitution of the modified name for the original name, and which is configured to achieve the expected result when executed by the web browser.

18. The computer system of claim 1 wherein the one or more original source code instructions comprise a first literal comprising an integer value; and
  wherein the one or more obfuscated source code instructions comprise, configured to evaluate to the integer value when executed by the web browser, an expression comprising a second literal.

19. The computer system of claim 18 wherein the one or more original source code instructions comprise a literal comprising an integer value;
  wherein the one or more obfuscated source code instructions comprise, configured to evaluate to the integer value when executed by the web browser, an expression comprising a mathematical operator, a first integer operand, and a second integer operand; and
  wherein the expression is encoded in one of JavaScript, ActionScript, Dart, VBScript, Typescript, Ruby, and Python.

20. The computer system of claim 8 wherein apply the one or more obfuscation transformations comprises repeatedly apply the one or more obfuscation transformations.

\* \* \* \* \*